(12) United States Patent
Aoki (10) Patent No.: US 11,760,147 B2
(45) Date of Patent: Sep. 19, 2023

(54) SHOCK ABSORBER (71) Applicant: SHOWA CORPORATION, Gyoda (JP)

(72) Inventor: Yasuhiro Aoki, Fukuroi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 461 days.

(21) Appl. No.: 17/108,746

(22) Filed: Dec. 1, 2020

(65) Prior Publication Data

US 2021/0078376 A1 Mar. 18, 2021

Related U.S. Application Data

(63) Continuation of application No. PCT/JP2018/025845, filed on Jul. 9, 2018.

(51) Int. Cl.
| | | |
|---|---|---|
| *B62K 25/08* | (2006.01) | |
| *B60G 13/08* | (2006.01) | |
| *F16F 9/06* | (2006.01) | |
| *F16F 9/32* | (2006.01) | |
| *F16F 9/36* | (2006.01) | |

(52) U.S. Cl.
CPC .............. *B60G 13/08* (2013.01); *F16F 9/062* (2013.01); *F16F 9/3214* (2013.01); *F16F 9/3221* (2013.01); *F16F 9/3278* (2013.01); *F16F 9/368* (2013.01)

(58) Field of Classification Search
CPC ........ B60G 13/08; F16F 9/062; F16F 9/3214; F16F 9/3221; F16F 9/3278; F16F 9/368
USPC ................. 188/322.15–322.18; 280/275, 276
See application file for complete search history.

(56) References Cited

U.S. PATENT DOCUMENTS

| | | | |
|---|---|---|---|
| 1,527,795 A | 2/1925 | Greve | |
| 8,801,021 B2 * | 8/2014 | Aoki | F16F 9/0236 280/276 |
| 2013/0221634 A1 | 8/2013 | Aoki | |

(Continued)

FOREIGN PATENT DOCUMENTS

| | | |
|---|---|---|
| JP | 59-189936 U | 12/1984 |
| JP | 2009-019642 A | 1/2009 |

(Continued)

OTHER PUBLICATIONS

Extended European Search Report dated Jan. 18, 2022 for the corresponding European Patent Application No. 18925834.6.

(Continued)

*Primary Examiner* — Christopher P Schwartz
(74) *Attorney, Agent, or Firm* — Leason Ellis LLP; Edward J. Ellis; Melvin C. Garner (57) ABSTRACT

A shock absorber includes an outer tube, an inner tube fitted to the outer tube so as to be able to move forward and backward, a cylinder provided inside the outer tube and extending inside the inner tube, a rod extending from an end portion of the inner tube exposed from the outer tube to an inside of the cylinder, and a piston which is provided on the rod and divides the inside of the cylinder to form a gas chamber. On an outer peripheral surface of the piston, a first lubricating member, a first seal member, and a second seal member are provided in this order from a side closest to the gas chamber to a side away from the gas chamber. The members are in sliding contact with an inner peripheral surface of the cylinder.

13 Claims, 7 Drawing Sheets

(56) References Cited

U.S. PATENT DOCUMENTS

2014/0157978 A1* 6/2014 Kamioka .................. F16F 9/02
                                                                                           92/51
2016/0244121 A1   8/2016 Ikeda

FOREIGN PATENT DOCUMENTS

| JP | 5714868 B2 | 5/2015 |
| JP | 2015-169238 A | 9/2015 |
| JP | 5847612 B2 | 12/2015 |
| JP | 2016-156466 A | 9/2016 |
| JP | 2017-180683 A | 10/2017 |

OTHER PUBLICATIONS

International Search Report dated Sep. 4, 2018 for the corresponding PCT International Application No. PCT/JP2018/025845.
Written Opinion dated Sep. 4, 2018 for the corresponding PCT International Application No. PCT/JP2018/025845.

* cited by examiner

SHOCK ABSORBER

CROSS-REFERENCE TO RELATED APPLICATION

This application is a continuation of PCT application No. PCT/JP2018/025845, which was filed on Jul. 9, 2018, the content of which is incorporated herein by reference in its entirety.

FIELD OF THE INVENTION

The present invention relates to a shock absorber particularly suitable for use in vehicles.

BACKGROUND OF THE INVENTION

As a shock absorber used in a vehicle, for example, there is a structure that can be incorporated as one of two shock absorbers forming a front fork of a saddle-ride type vehicle on which an occupant rides. Such a shock absorber is known, for example, from Patent Literature 1.

The shock absorber known in Patent Literature 1 has an outer tube, an inner tube fitted to the outer tube so that one end portion thereof can move forward and backward, a cylinder extending from the outer tube into the inner tube, a rod extending from the other end of the inner tube into the cylinder, and a piston provided on the rod as a basic structure.

This shock absorber is a kind of air spring type shock absorber which has two gas chambers with a piston as a boundary. A first gas chamber is a space where the inside of the cylinder is divided by the piston. A second gas chamber is a space outside the cylinder in a space surrounded by the outer tube and the inner tube. Therefore, the shock absorber functions as a suspension spring which elastically supports the vehicle body by the reaction force balance between an air spring by air enclosed in the first gas chamber and an air spring by air enclosed in the second gas chamber.

A first seal member, a second seal member, a third seal member, and a piston ring are provided in this order from a side closest to the first gas chamber to a far side on an outer peripheral surface of the piston. Respective sealing lips of the three seal members are slidably in contact with an inner peripheral surface of the cylinder. Three sealing members seal between the outer peripheral surface of the piston and the inner peripheral surface of the cylinder.

When the piston performs a compression operation, the sealing lip of each seal member slides on the inner peripheral surface of the cylinder. Here, "compression operation" means that the piston moves in an approach direction (direction in which the air in the first gas chamber is compressed) with respect to the cylinder.

The sealing lip of the first seal member faces the first gas chamber. On the other hand, the sealing lips of the second and third seal members face away from the first gas chamber. Therefore, the second and third seal members can prevent abrasion powder of a piston ring from entering the first seal member.

Patent Literature 1: Japanese Patent No. 5847612

However, in the shock absorber known from Patent Literature 1, the first gas chamber has an oilless structure that is not filled with oil. The piston part is also almost oilless. In this way, even when the shock absorber is oilless and has a configuration in which the sealing lip slides on the inner peripheral surface of the cylinder, it has been required to secure the reaction force balance between the air springs to further enhance the steering stability and riding comfort of the vehicle.

SUMMARY OF THE INVENTION

An object of the invention is to provide a technology which can enhance the steering stability and riding comfort of a vehicle even when a gas chamber and a piston part are oilless in a shock absorber which can be adopted in the vehicle.

According to the invention, there is provided a shock absorber which includes, a cylindrical outer tube with one end as a closed end and the other end as an open end, an inner tube partially fitted to the outer tube so as to be able to move forward and backward, a cylinder provided inside the outer tube and extending inside the inner tube, a rod extending from an end portion of the inner tube exposed from the outer tube to an inside of the cylinder, a piston which is provided on the rod and divides the inside of the cylinder to form a gas chamber, a first lubricating member, which is provided on a side closest to the gas chamber in an outer peripheral surface of the piston so as to be capable of sliding contact with an inner peripheral surface of the cylinder, and which contains a lubricant, a first seal member, which is provided at a position farther from the gas chamber than the first lubricating member in an outer peripheral surface of the piston, and in which a sealing lip slidably in contact with the inner peripheral surface of the cylinder faces the gas chamber, and a second seal member, which is provided at a position farther from the gas chamber than the first seal member in the outer peripheral surface of the piston, and in which a sealing lip slidably in contact with the inner peripheral surface of the cylinder is directed opposite to the gas chamber.

Advantageous Effects of Invention

According to the invention, the lubricating member is provided on a side closest to the gas chamber in the outer peripheral surface of the piston. When the piston performs a compression operation, the lubricating member first slides on the inner peripheral surface of the cylinder along with the piston to apply a lubricating film to the inner peripheral surface (lubricate the sliding surface). Immediately after that, the sealing lips of the first seal member and the second seal member slide on the inner peripheral surface of the cylinder. That is, each sealing lip slides on the lubricating film.

Despite the oilless configuration of the gas chamber and the piston part, the sliding of each sealing lip against the inner peripheral surface of the cylinder is smooth. Therefore, the durability and sealability of each seal member can be improved. Since the piston can be operated smoothly with respect to the cylinder, as a result, the operation performance of the shock absorber can be improved. Since the shock absorber operates more smoothly, it is possible to further enhance the steering stability and riding comfort of the vehicle.

DETAILED DESCRIPTION OF THE INVENTION

A mode for carrying out the invention will be described below with reference to the accompanying drawings.

First Example

A front fork 10 according to a first example and shock absorbers 20 and 100 used for the front fork 10 will be described with reference to FIGS. 1 to 5.

Figure 1:
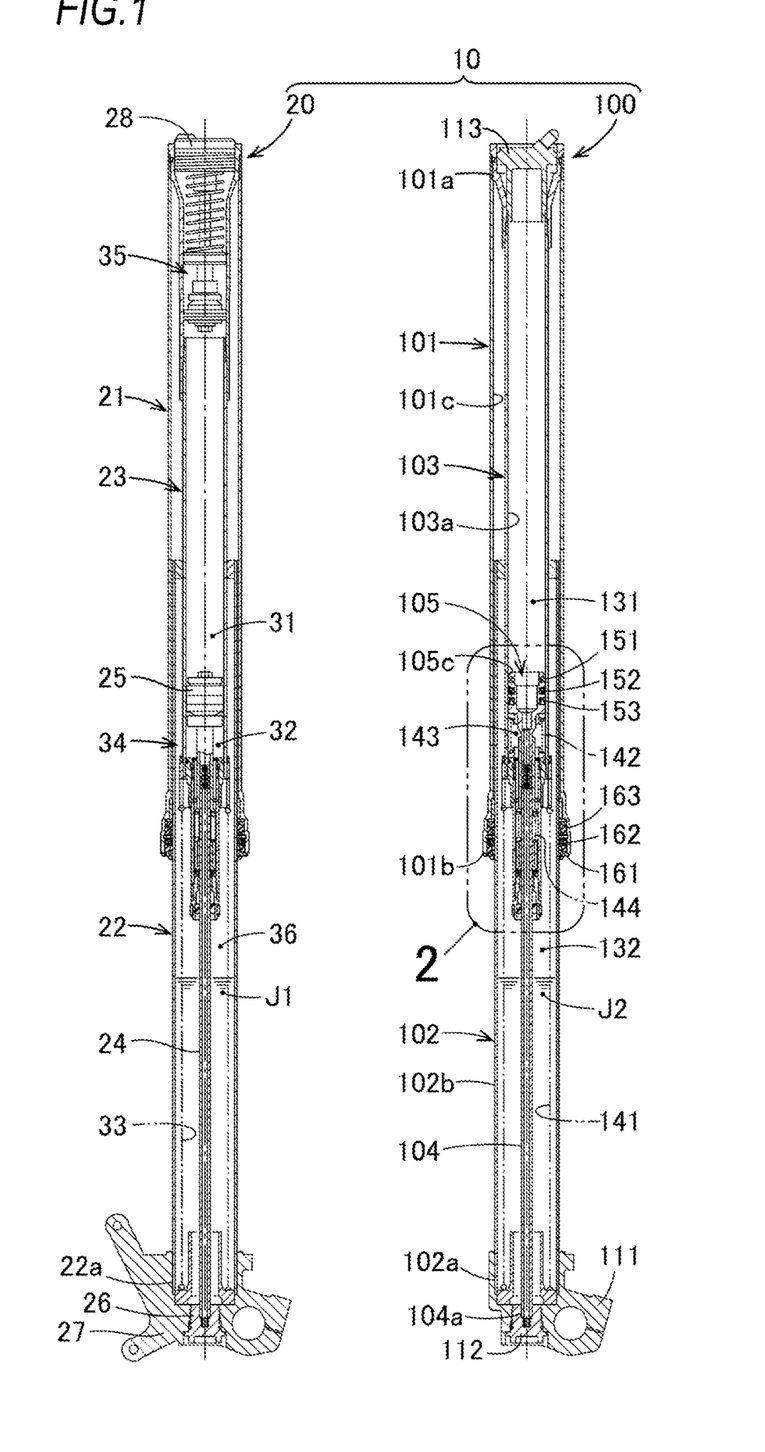
FIG. 1 is a cross-sectional front view of a front fork using a shock absorber according to a first example of the invention.

As illustrated in FIG. 1, the front fork 10 is used, for example, in a vehicle, and is used in, for example, a motorcycle which is a kind of saddle-ride type vehicle on which an occupant rides. The front fork 10 has two shock absorbers 20 and 100 which are arranged parallel to each other and vertically.

One 20 of the two shock absorbers 20 and 100 is the shock absorber 20 with a damping force generating unit which has two damping force generating units 34 and 35 by hydraulic pressure built therein. The other 100 of the two shock absorbers 20 and 100 is the air spring type shock absorber 100 which does not have a damping force generating unit, but has a first gas chamber 131, a second gas chamber 132, and a first spring 141. That is, the shock absorber 100 (air spring type shock absorber 100) has a structure that can be incorporated as one of the two shock absorbers 20 and 100 which form the front fork 10 of the saddle-ride type vehicle.

First, the shock absorber 20 with the damping force generating unit will be described. Since the shock absorber 20 with the damping force generating unit has a known structure, only the outline will be described. As illustrated in FIG. 1, the shock absorber 20 with the damping force generating unit includes a cylindrical outer tube 21 extending in a vertical direction, an inner tube 22 fitted to the outer tube 21 such that the upper half thereof can move forward and backward, a cylinder 23 extending from an upper end of the outer tube 21 into the inner tube 22, a rod 24 extending from a lower end portion 22a of the inner tube 22 into the cylinder 23, and a piston 25 provided on the rod 24 as basic components. As described above, the shock absorber 20 with the damping force generating unit has a telescopic type structure in which the inner tube 22 can be moved forward and backward with respect to the outer tube 21.

More specifically, the upper end of the outer tube 21 is closed. The lower end of the inner tube 22 is closed by a bottom bolt 26 and is connected to a wheel side bracket 27. The upper end of the cylinder 23 is fixed to the upper end of the outer tube 21 and is closed by a fork bolt 28. The lower end portion of the rod 24 is connected to the lower end portion 22a of the inner tube 22 via the bottom bolt 26 and the wheel side bracket 27. The piston 25 divides the inside of the cylinder 23 into a piston-side oil chamber 31 and a rod side oil chamber 32. The piston-side oil chamber 31 is located in the upper half of the cylinder 23. The outer tube 21 and the inner tube 22 are biased in an extension direction by a compression coil spring 33.

The first damping force generating unit 34 is configured with the cylinder 23, the rod 24, and the piston 25. The second damping force generating unit 35 is provided on the upper portion of the outer tube 21. Lubricating oil J1 is stored in a lower portion of the inner tube 22. In a space surrounded by the outer tube 21 and the inner tube 22, a space outside the cylinder 23 and above the oil level of the lubricating oil J1 forms a gas chamber 36. The air enclosed in the gas chamber 36 has the function of an air spring.

The first damping force generating unit 34 and the second damping force generating unit 35 generate a damping force for damping the expansion and contraction vibration of a compression coil spring 33 of the shock absorber 20 with the damping force generating unit, an air spring of the gas chamber 36, the air spring of the air spring type shock absorber 100, and the first spring 141 (compression coil spring 141) due to the respective elastic forces.

Figure 2:
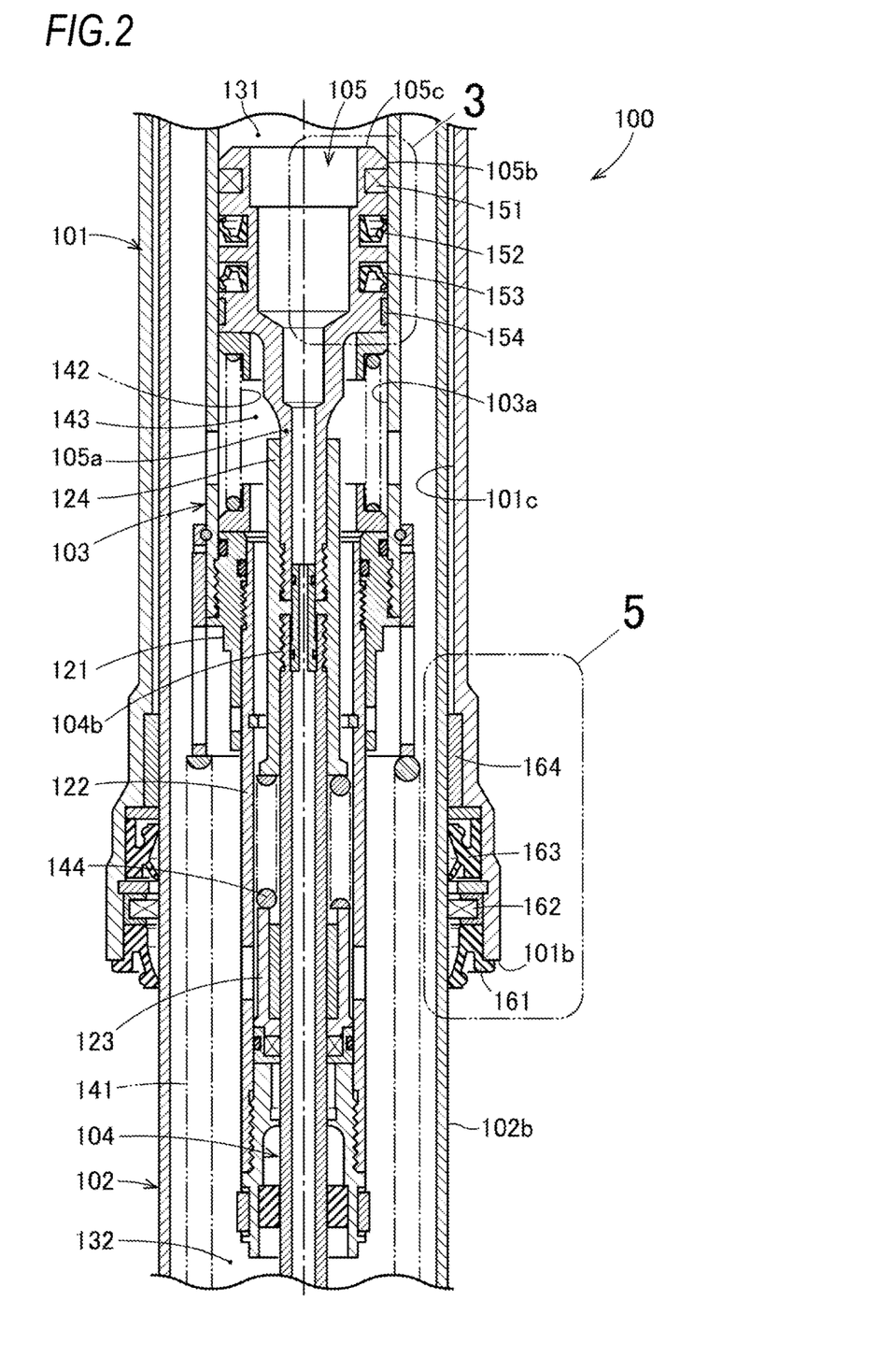
FIG. 2 is an enlarged view of a part 2 in FIG. 1.

Next, the air spring type shock absorber 100 will be described. As illustrated in FIGS. 1 and 2, the air spring type shock absorber 100 includes the outer tube 101, the inner tube 102, the cylinder 103, the rod 104, and the piston 105 as basic constituent elements. That is, this air spring type shock absorber 100 has a telescopic type configuration in which the inner tube 102 can be moved forward and backward with respect to the outer tube 101.

The outer tube 101 (first tube 101) is a cylindrical member which extends in the vertical direction and has its upper end closed. That is, the outer tube 101 has the upper end (one end) as a closed end 101a and the lower end (the other end) as an open end 101b.

The inner tube 102 (second tube 102) is fitted in the outer tube 101 such that the upper half thereof can move forward and backward. The lower end of the inner tube 102 is connected to the wheel side bracket 111 and is closed by a removable bottom bolt 112.

The cylinder 103 is provided inside the outer tube 101 and extends from the closed end 101a of the outer tube 101 into the inner tube 102. More specifically, the cylinder 103 has a cylindrical shape whose upper end is closed by a removable fork bolt 113 and is fixed to the closed end 101a of the outer tube 101.

An annular connecting member 121 is provided at the lower end portion of the cylinder 103. The connecting member 121 is provided with a guide holder 122 extending downward. The guide holder 122 is a pipe having a diameter smaller than that of the cylinder 103 and has an annular holder portion 123 at the bottom.

The rod 104 extends from a lower end portion 102a of the inner tube 102 into the cylinder 103. More specifically, a lower end portion 104a of the rod 104 is connected to the lower end portion 102a of the inner tube 102 via the bottom bolt 112 and the wheel side bracket 111. The rod 104 is slidably supported by the holder portion 123. An upper end portion 104b of the rod 104 is located above the holder portion 123. A pipe-shaped piston holder 124 is provided on the upper end portion 104b. Specifically, the inner peripheral surface of the piston holder 124 is fitted and fixed to the upper end portion 104b.

The piston 105 is located inside the cylinder 103 and above the connecting member 121. The piston 105 is provided on the rod 104 and divides the inside of the cylinder 103 to form a gas chamber 131. Specifically, a shaft 105a extends downward from the lower end of the piston 105. The shaft 105a is fitted and fixed in the piston holder 124. As a result, the piston 105 is provided on the upper end portion 104b of the rod 104. The gas chamber 131 is a space surrounded by the inside of the upper half of the cylinder 103 closed by the fork bolt 113 and the piston 105. Hereinafter, the gas chamber 131 will be appropriately referred to as the "first gas chamber 131" or the "inner air spring chamber 131".

Lubricating oil J2 is stored in the lower portion of the inner tube 102. In a space surrounded by the outer tube 101 and the inner tube 102, a space outside the cylinder 103 and above the oil level of the lubricating oil J2 forms a gas chamber 132. Hereinafter, the gas chamber 132 will be appropriately referred to as the "second gas chamber 132" or the "outer air spring chamber 132".

Compressed air is enclosed in the first gas chamber 131 and the second gas chamber 132. The pressure of the first gas chamber 131 is set higher than the pressure of the second gas chamber 132. The pressure of the second gas chamber 132 is almost atmospheric pressure. However, the second gas chamber 132 may be pressurized if necessary.

The air trapped in the first gas chamber 131 and the second gas chamber 132 has the function of an air spring. The compressed air in the first gas chamber 131 and the second gas chamber 132 functions as an air spring which exerts a reaction force according to the amount of compression of the outer tube 101 and the inner tube 102 in a longitudinal direction. This air spring functions as a suspension spring which elastically supports the vehicle body by constantly urging the outer tube 101 and the inner tube 102 in the extension direction. The amount of compression of the outer tube 101 and the inner tube 102 in the longitudinal direction is equal to the amount of compression of the air spring type shock absorber 100. The air spring exerts a reaction force according to the compression amount of the air spring type shock absorber 100 and urges the air spring type shock absorber 100 in the extension direction.

The outer tube 101 and the inner tube 102 are biased in the extension direction by the first spring 141. The first spring 141 is composed of a compression coil spring built in the inner tube 102. The function of the air spring by the compressed air in the first gas chamber 131 and the second gas chamber 132 and the biasing force of the first spring 141 can absorb the impact force that the vehicle receives from the road surface.

A second spring 142 (balance spring 142) made of compression coil spring is interposed between the upper end surface of the connecting member 121 and the lower end surface of the piston 105. A space 143 (spring chamber 143) in which the second spring 142 is housed in the cylinder 103 communicates with the second gas chamber 132. A third spring 144 (rebound spring 144) made of compression coil spring is interposed between the upper end surface of the holder portion 123 and the lower end surface of the piston holder 124.

As is clear from the above description, the air spring type shock absorber 100 includes, an air spring (hereinafter referred to as "first air spring") by compressed air in the gas chamber 131 (first gas chamber 131), an air spring (hereinafter referred to as "second air spring") by compressed air in a gas chamber 132 (second gas chamber 132) outside the cylinder 103 in a space surrounded by the outer tube 101 and the inner tube 102, and a spring 141 (first spring 141) for urging the outer tube 101 and the inner tube 102 in a direction to extend each other.

Figure 3:
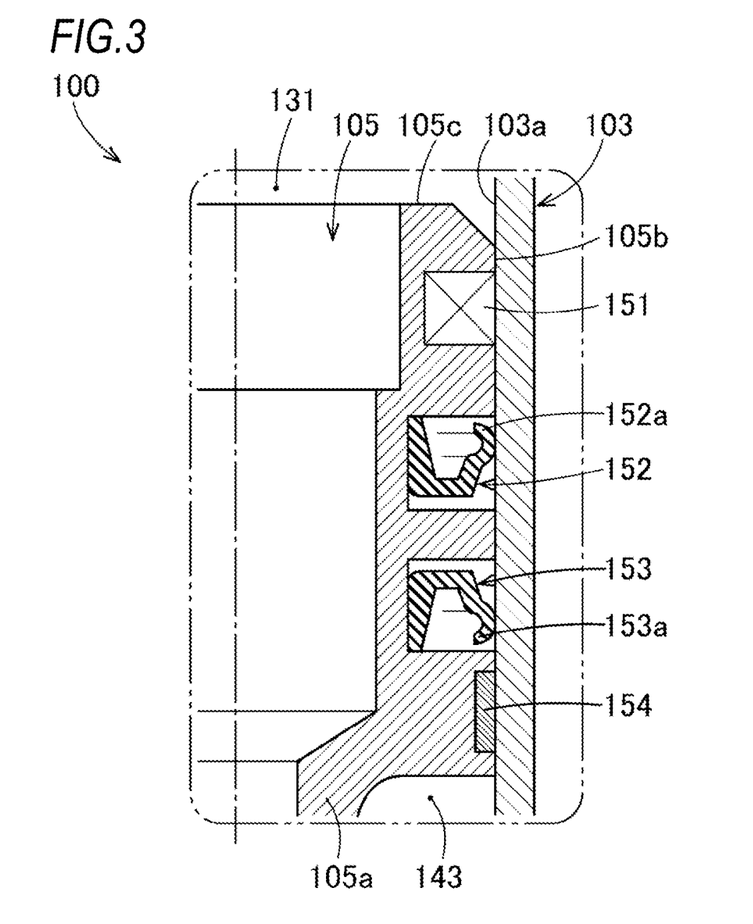
FIG. 3 is an enlarged view of a part 3 in FIG. 2.

Next, a seal structure between an inner peripheral surface 103a of the cylinder 103 and an outer peripheral surface 105b of the piston 105 will be described with reference to FIGS. 2 and 3. A lubricating member 151, a first seal member 152, a second seal member 153, and a piston ring 154 are provided on the outer peripheral surface 105b of the piston 105 in this order from the first gas chamber 131 side toward the second gas chamber 132 side. The lubricating member 151, the first seal member 152, the second seal member 153, and the piston ring 154 can be in sliding contact with the inner peripheral surface 103a of the cylinder 103.

Hereinafter, the lubricating member 151 will be referred to as "first lubricating member 151" as appropriate. The first lubricating member 151 is provided in a portion of the outer peripheral surface 105b of the piston 105 closest to the first gas chamber 131, that is, a portion closest to an end surface 105c in an advancing direction of the piston 105 with respect to the cylinder 103. The first lubricating member 151 is a member containing a lubricant such as lubricating oil and slidably in contact with the inner peripheral surface 103a of the cylinder 103. More specifically, the first lubricating member 151 is a ring-shaped member obtained by impregnating a material (for example, felt or non-woven fabric) having a high impregnation property with a lubricant with the lubricant. By sliding the first lubricating member 151 on the inner peripheral surface 103a of the cylinder 103, a film of the lubricant can be applied to the inner peripheral surface 103a.

The first seal member 152 is provided at a position farther from the gas chamber 131 (first gas chamber 131) than the first lubricating member 151. A sealing lip 152a of the first seal member 152 faces the first gas chamber 131 and is slidably in contact with the inner peripheral surface 103a of the cylinder 103. The first seal member 152 can enhance the airtightness of the first gas chamber 131.

The second seal member 153 is provided at a position farther from the gas chamber 131 (first gas chamber 131) than the first seal member 152. A sealing lip 153a of the second seal member 153 is in an opposite direction to the first gas chamber 131 and slidably contacts the inner peripheral surface 103a of the cylinder 103. The second seal member 153 can enhance the airtightness of the second gas chamber 132 and the second spring chamber 143.

In this way, the first seal member 152 and the second seal member 153 enhance the sealability between the inner peripheral surface 103a of the cylinder 103 and the outer peripheral surface 105b of the piston 105. Therefore, the function of the air springs (first air spring and second air spring) due to the compressed air in the first gas chamber 131 and the second gas chamber 132 can be maintained. Moreover, even when abrasion powder of the piston ring 154 is generated by sliding the piston ring 154 on the inner peripheral surface 103a of the cylinder 103, the second seal member 153 can prevent the abrasion powder from entering the inside of the first gas chamber 131.

The above description is summarized as follows. As illustrated in FIGS. 1 to 3, the shock absorber 100 (air spring type shock absorber 100) of the first example includes, a cylindrical outer tube 101 with one end as a closed end 101a and the other end as an open end 101b, an inner tube 102 partially fitted to the outer tube 101 so as to be able to move forward and backward, a cylinder 103 provided inside the outer tube 101 and extending inside the inner tube 102, a rod 104 extending from an end portion 102a (that is, the end portion 102a which is always exposed from the outer tube 101, even when it is compressed most) of the inner tube 102 exposed from the outer tube 101 to an inside of the cylinder 103, a piston 105 which is provided on the rod 104 and divides the inside of the cylinder 103 to form a gas chamber 131 (first gas chamber 131), a first lubricating member 151 (lubricating member 151), which is provided on a side closest to the gas chamber 131 in an outer peripheral surface 105b of the piston 105 so as to be capable of sliding contact with an inner peripheral surface 103a of the cylinder 103, and which contains a lubricant, a first seal member 152, which is provided at a position farther from the gas chamber 131 than the first lubricating member 151 in an outer peripheral surface 105b of the piston 105, and in which a sealing lip 152a slidably in contact with the inner peripheral surface 103a of the cylinder 103 faces the gas chamber 131, and a second seal member 153, which is provided at a position farther from the gas chamber 131 than the first seal member 152 in the outer peripheral surface 105b of the piston 105, and in which a sealing lip 153a slidably in contact with the inner peripheral surface 103a of the cylinder 103 is directed opposite to the gas chamber 131.

As described above, in the outer peripheral surface 105b of the piston 105, the first lubricating member 151 is provided on the side closest to the first gas chamber 131. When the piston 105 performs compression operation, the first lubricating member 151 first slides on the inner peripheral surface 103a of the cylinder 103 together with the piston 105 to apply a lubricating film to the inner peripheral surface 103a (lubricate the sliding surface). Immediately thereafter, the sealing lips 152a and 153a of the first seal member 152 and the second seal member 153 slide on the inner peripheral surface 103a of the cylinder 103. That is, respective sealing lips 152a and 153a slide on the lubricating film.

Although the first gas chamber 131 and the piston 105 have an oilless structure, the sliding of the sealing lips 152a, 153a with respect to the inner peripheral surface 103a of the cylinder 103 is smooth. Therefore, it is possible to improve the durability and sealing performance of the respective seal members 152 and 153. Since the piston 105 can be operated smoothly with respect to the cylinder 103, the operation performance of the shock absorber 100 can be improved as a result. Since the shock absorber 100 operates more smoothly, it is possible to further enhance the steering stability and riding comfort of the vehicle.

In particular, smoothing the compression operation of the piston 105 can be an important factor in enhancing the riding comfort of the vehicle. In order to increase the airtightness of the gas chamber 131, the sealing lip 152a of the first seal member 152 faces the gas chamber 131 side. Since the sealing lip 152a of the first seal member 152 slides on the inner peripheral surface 103a after the lubricating film is applied by the first lubricating member 151, the sealing lip 152a can slide smoothly. Therefore, the riding comfort of the vehicle can be improved.

In addition, since the first gas chamber 131 and the piston 105 can be made oilless, the weight of the shock absorber 100 can be reduced and the maintenance of the shock absorber 100 is easy.

Furthermore, the shock absorber 100 (air spring type shock absorber 100) of the first example is a so-called hybrid shock absorber combining an air spring and a mechanical spring, which includes, a first air spring by compressed air in the gas chamber 131 (first gas chamber 131), a second air spring by compressed air in a gas chamber 132 (second gas chamber 132. With or without storing lubricating oil J2) outside the cylinder 103 in a space surrounded by the outer tube 101 and the inner tube 102, and a spring 141 (first spring 141) for urging the outer tube 101 and the inner tube 102 in a mutually extending direction.

As described above, the lubricating oil is not stored inside the first gas chamber 131. Here, it is assumed that lubricating oil comes out of the first gas chamber 131 when the fork bolt 113 is removed from the upper end of the cylinder 103 and the shock absorber 100 is turned upside down. In this case, the lubricating oil J2 stored in the lower portion of the inner tube 102 has leaked from between the inner peripheral surface 103a of the cylinder 103 and the first and second seal members 152 and 153. Therefore, it can be easily determined that at least one of the first seal member 152 and the second seal member 153 is damaged.

Next, a modification example (a modified piston seal structure) of the seal structure between the inner peripheral surface 103a of the cylinder 103 and the outer peripheral surface 105b of the piston 105 will be described with reference to FIG. 4. The modified piston seal structure is characterized in that a second lubricating member 155 is added to the seal structure illustrated in FIGS. 2 and 3, and since the other configurations are the same as those in the first embodiment, the description thereof will be omitted.

More specifically, the outer peripheral surface 105b of the piston 105 is provided with the second lubricating member 155 between the first seal member 152 and the second seal member 153. Since the second lubricating member 155 has the same structure as the first lubricating member 151, the description thereof will be omitted.

Thus, the shock absorber 100 (air spring type shock absorber 100) further includes, a second lubricating member 155, which is provided between the first seal member 152 and the second seal member 153 in the outer peripheral surface 105b of the piston 105 so as to be capable of sliding contact with the inner peripheral surface 103a of the cylinder 103 and, which contains a lubricant.

Therefore, when the piston 105 reciprocates, the inner peripheral surface 103a of the cylinder 103 can be lubricated not only by the first lubricating member 151 but also by the second lubricating member 155. Therefore, the sliding of respective sealing lips 152a and 153a of the first seal member 152 and the second seal member 153 with respect to the inner peripheral surface 103a of the cylinder 103 can be made even smoother.

Figure 5:
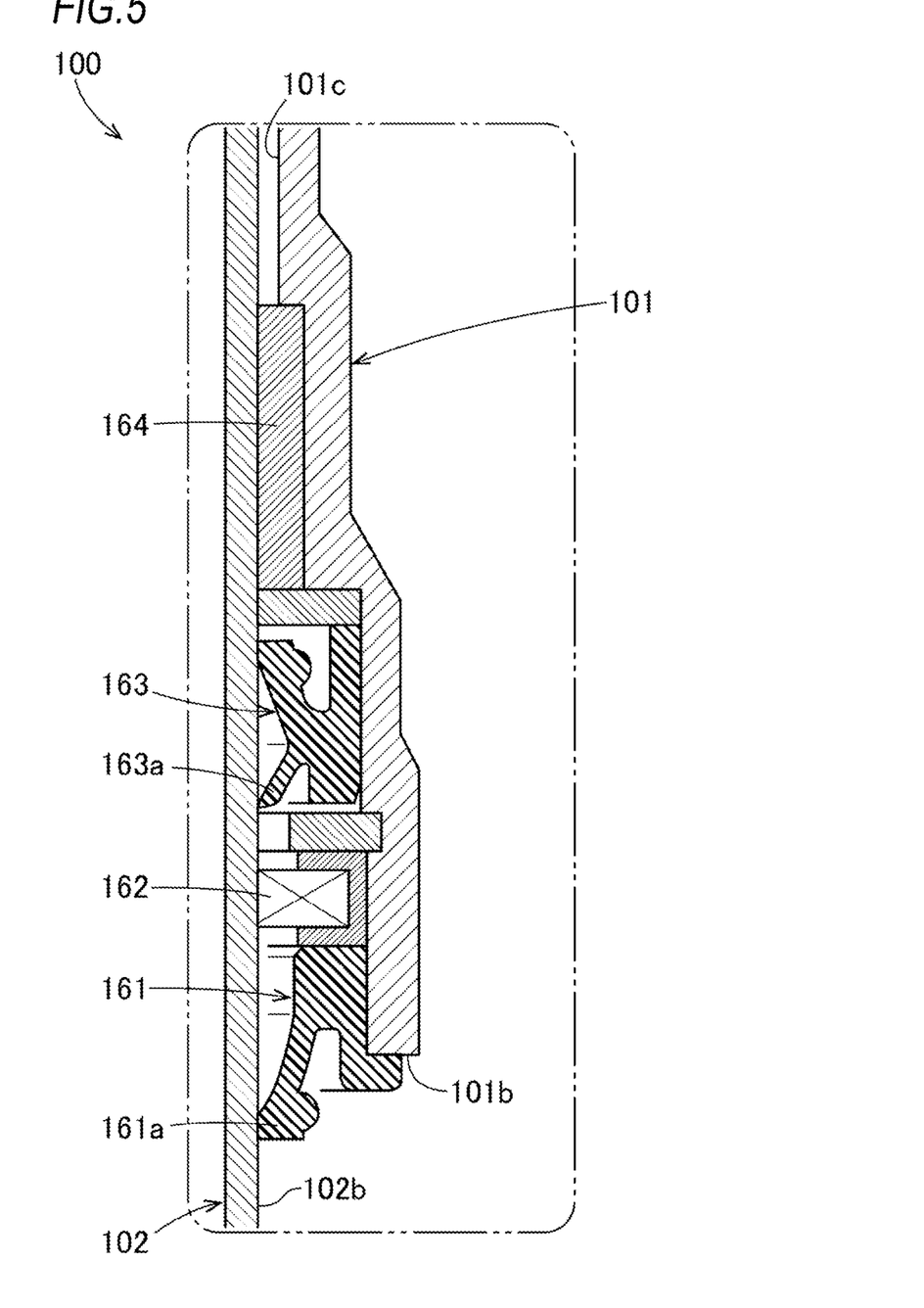
FIG. 5 is an enlarged view of a part 5 in FIG. 2.

Next, a seal structure between an inner peripheral surface 101c of the outer tube 101 and an outer peripheral surface 102b of the inner tube 102 will be described with reference to FIGS. 1, 2, and 5. On the inner peripheral surface 101c of the outer tube 101, a first outer seal member 161, an outer lubricating member 162, a second outer seal member 163, and a bush 164 are provided from the open end 101b to the closed end 101a side of the outer tube 101 (see FIG. 1) in this order. The first outer seal member 161, the outer lubricating member 162, and the second outer seal member 163 can be in sliding contact with the outer peripheral surface 102b of the inner tube 102.

In this way, the two seal members 161 and 163 and the one lubricating member 162 are located further on the radially outer side than the piston 105 and are provided on the inner peripheral surface 101c of the outer tube 101. Therefore, the names of those members 161, 162, and 163 are given "outer" and they are respectively referred to as the first outer seal member 161, the outer lubricating member 162, and the second outer seal member 163.

The first outer seal member 161 is provided at the open end 101b in the inner peripheral surface 101c of the outer tube 101. A sealing lip 161a of the first outer seal member 161 faces the outer side in the longitudinal direction of the outer tube 101 and is slidably in contact with the outer peripheral surface 102b of the inner tube 102. The first outer seal member 161 can prevent dust from entering the outer tube 101 from the outside.

The outer lubricating member 162 is provided closer to the closed end 101a side than the first outer seal member 161 in the inner peripheral surface 101c of the outer tube 101 and slidably in contact with the outer peripheral surface 102b of the inner tube 102. More specifically, as similar to the first lubricating member 151, the outer lubricating member 162 is a ring-shaped member obtained by impregnating a material (for example, felt or non-woven fabric) having a high impregnation property with a lubricant with the lubricant. By the outer lubricating member 162 sliding on the outer peripheral surface 102b of the inner tube 102, a lubricant film can be applied to the outer peripheral surface 102b.

The second outer seal member 163 is provided closer to the closed end 101a side than the outer lubricating member 162 in the inner peripheral surface 101c of the outer tube 101 and slidably in contact with the outer peripheral surface 102b of the inner tube 102. A sealing lip 163a of the second outer seal member 163 has a so-called double lip structure which faces both sides in the longitudinal direction of the inner tube 102. The second outer seal member 163 can prevent dust from entering the outer tube 101 from the outside and enhance the airtightness of the second gas chamber 132.

The bush 164 slidably supports the outer peripheral surface 102b of the inner tube 102.

Thus, the shock absorber 100 (air spring type shock absorber 100) further includes, a first outer seal member 161, which is provided on the open end 101b in an inner peripheral surface 101c of the outer tube 101 so as to be capable of sliding contact with the outer peripheral surface 102b of the inner tube 102 and, in which a sealing lip 161a slidably in contact with an outer peripheral surface 102b of the inner tube 102 faces an outer side in a longitudinal direction of the outer tube 101, an outer lubricating member 162, which is provided further on the closed end 101a side (see FIG. 1) than the first outer seal member 161 in the inner peripheral surface 101c of the outer tube 101 so as to be capable of sliding contact with the outer peripheral surface 102b of the inner tube 102 and, which contains a lubricant, and a second outer seal member 163 which is provided further on to the closed end 101a side than the outer lubricating member 162 in the inner peripheral surface 101c of the outer tube 101 so as to be capable of sliding contact with the outer peripheral surface 102b of the inner tube 102.

Since the first outer seal member 161 is located at the open end 101b of the outer tube 101, it functions as a dust seal. The second outer seal member 163 functions as an air seal between the outer tube 101 and the inner tube 102. The outer peripheral surface 102b of the inner tube 102 is in a relatively dry state without a lubricating film.

On the other hand, when the outer tube 101 and the inner tube 102 expand and contract with each other, the outer lubricating member 162 slides on the outer peripheral surface 102b of the inner tube 102, and thus a lubricating film is applied to the outer peripheral surface 102b (lubricate the sliding surface). Immediately after that, the sealing lip 161a of the first outer seal member 161 and the sealing lip 163a of the second outer seal member 163 slide on the outer peripheral surface 102b of the inner tube 102. That is, each sealing lip 161a and 163a slides on the lubricating film.

The sliding of respective sealing lips 161a and 163a with respect to the outer peripheral surface 102b of the inner tube 102 is smooth. It is possible to enhance the durability and sealing performance of respective seal members 161 and 163. Since the expansion and contraction operation of the outer tube 101 and the inner tube 102 can be made smooth, as a result, the operation performance of the shock absorber 100 can be improved. Since the shock absorber 100 operates more smoothly, it is possible to further enhance the steering stability and riding comfort of the vehicle.

Second Example

Figure 6:
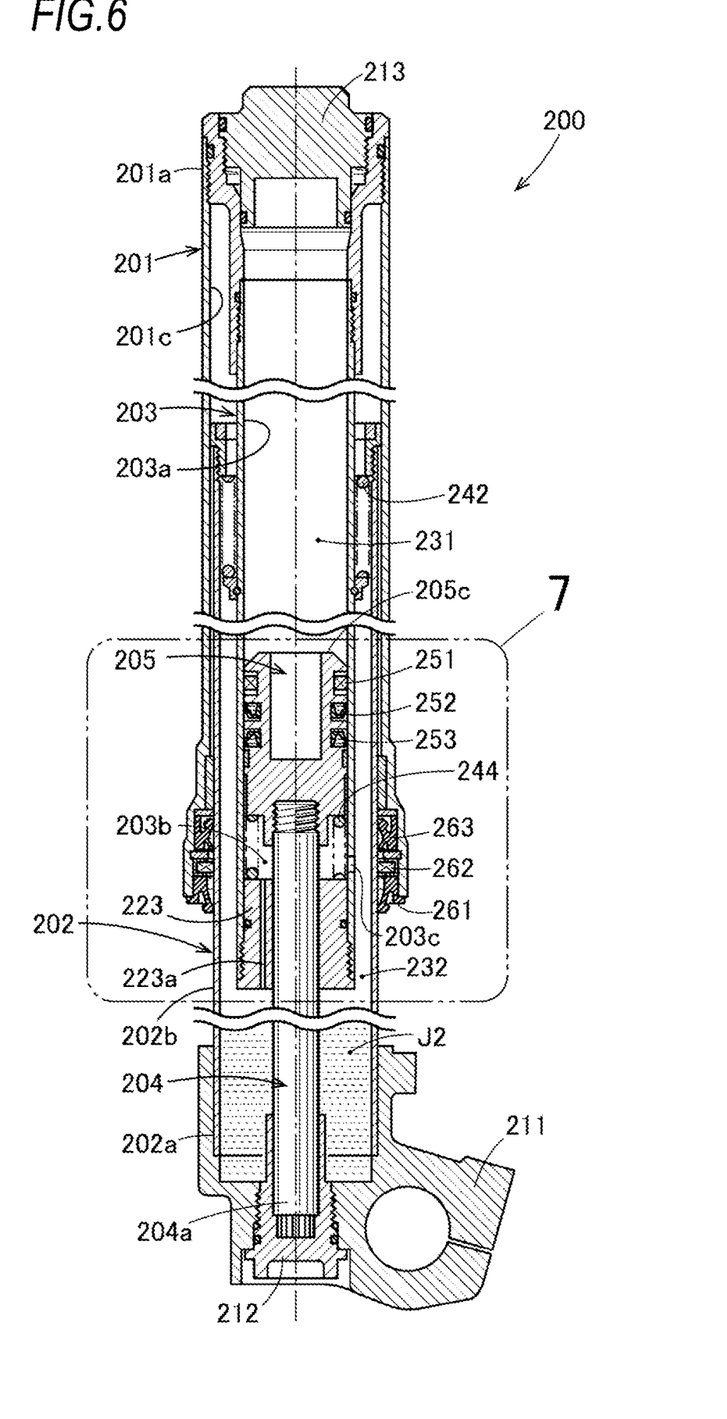
FIG. 6 is a cross-sectional view in which a part of an air spring type shock absorber according to a second example of the invention is omitted.
Figure 7:
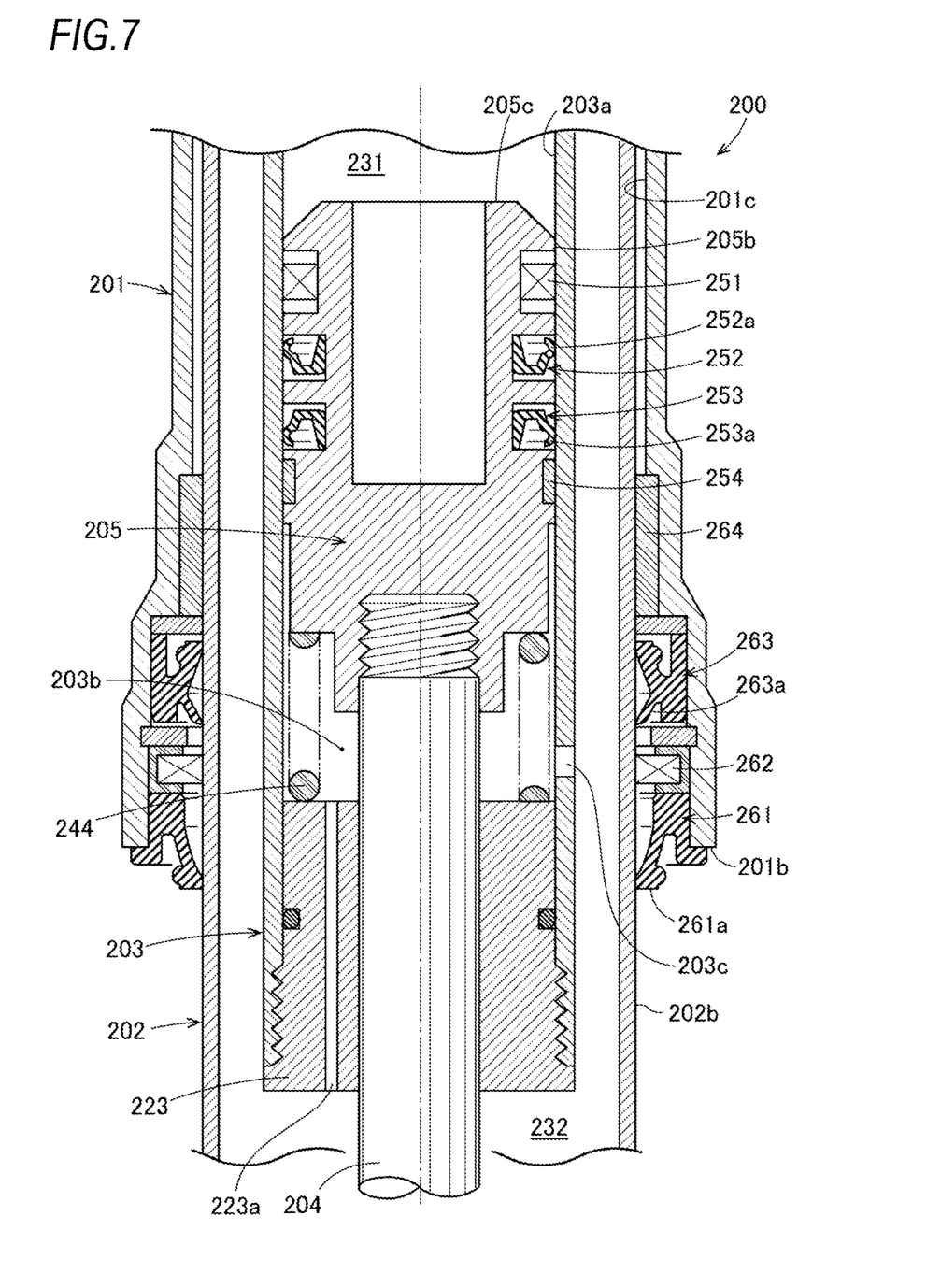
FIG. 7 is an enlarged view of a part 7 in FIG. 6.

A shock absorber 200 (air spring type shock absorber 200) according to a second example will be described with reference to FIGS. 6 and 7. An air spring type shock absorber 200 of the second example does not have a member corresponding to the first spring 141 (see FIG. 1) in contrast to the air spring type shock absorber 100 of the first example illustrated in FIGS. 1 to 4. That is, the air spring type shock absorber 200 is characterized in that it functions as a suspension spring which elastically supports the vehicle body only by the function of the air spring by the air enclosed in a first gas chamber 231 and a second gas chamber 232.

In this way, the air spring type shock absorber 200 of the second example has the same basic configuration as the air spring type shock absorber 100 of the first embodiment except that it does not have a member corresponding to the first spring 141. Therefore, with respect to the constituent elements of the air spring type shock absorber 100 of the first example, the constituent elements substantially equivalent are replaced with the reference numerals in the 100 series to the reference numerals in the 200 series, and detailed description thereof will be omitted.

The air spring type shock absorber 200 has an outer tube 201 (first tube 201), an inner tube 202 (second tube 202), a cylinder 203, a rod 204, and a piston 205 as basic constituent elements.

The outer tube 201 is a cylindrical member which extends vertically and has its upper end closed.

The inner tube 202 is fitted in the outer tube 201 such that the upper half of the inner tube 202 can move forward and backward. The lower end of the inner tube 202 is connected to the wheel side bracket 211 and is closed by a removable bottom bolt 212.

The cylinder 203 is provided inside the outer tube 201 and extends from an upper end 201a (closed end 201a) of the outer tube 201 into the inner tube 202. The cylinder 203 has its upper end closed by a removable fork bolt 213 and is fixed to the closed end 201a of the outer tube 201. An annular holder portion 223 is provided at the lower end of the cylinder 203.

The rod 204 extends from a lower end portion 202a of the inner tube 202 into the cylinder 203. More specifically, a lower end portion 204a of the rod 204 is connected to the lower end portion 202a of the inner tube 202 via a bottom bolt 212 and a wheel side bracket 211. The upper end portion of the rod 204 is located above the holder portion 223 and is slidably supported by the holder portion 223.

The piston 205 is located above the holder portion 223 inside the cylinder 203. The piston 205 is provided on the upper end of the rod 204 and divides the inside of the cylinder 203 to form a gas chamber 231. The gas chamber 231 is a space surrounded by the inside of the upper half of the cylinder 203 closed by the fork bolt 213 and the piston 205. Hereinafter, the gas chamber 231 will be referred to as "first gas chamber 231" or "inner air spring chamber 231" as appropriate.

Lubricating oil J2 is stored in the lower portion of the inner tube 202. In a space surrounded by the outer tube 201 and the inner tube 202, a space outside the cylinder 203 and above the oil level of the lubricating oil J2 forms a gas chamber 232. Hereinafter, the gas chamber 232 will be referred to as "second gas chamber 232" or "outer air spring chamber 232" as appropriate.

Compressed air is enclosed in the first gas chamber 231 and the second gas chamber 232. The enclosed air has a function of an air spring (first air spring and second air spring). The air spring functions as a suspension spring which elastically supports the vehicle body by constantly urging the outer tube 201 and the inner tube 202 in the extension direction.

A balance spring 242 is interposed in the space surrounded by the outer tube 201 and the inner tube 202. A rebound spring 244 is interposed between a lower end surface of the piston 205 and an upper end surface of the holder portion 223. A space 203b which contains the rebound spring 244 in the cylinder 203 communicates with the second gas chamber 232 via one or both of a communication hole 203c formed in the cylinder 203 and a communication hole 223a formed in the holder portion 223.

A first lubricating member 251, a first seal member 252, a second seal member 253, and a piston ring 254 are provided on an outer peripheral surface 205b of the piston 205 in this order from the first gas chamber 231 side to the second gas chamber 232 side. Each of the members 251, 252, 253, and 254 can be in sliding contact with an inner peripheral surface 203a of the cylinder 203.

The first lubricating member 251 is provided at a portion (a portion closest to the end surface 205c of the piston 205) of the outer peripheral surface 205b of the piston 205 closest to the first gas chamber 231. The first seal member 252 is provided at a position farther from the first gas chamber 231 than the first lubricating member 251. A sealing lip 252a of the first seal member 252 faces the first gas chamber 231. The second seal member 253 is provided at a position farther from the first gas chamber 231 than the first seal member 252. A sealing lip 253a of the second seal member 253 is opposite to the first gas chamber 231.

Figure 4:
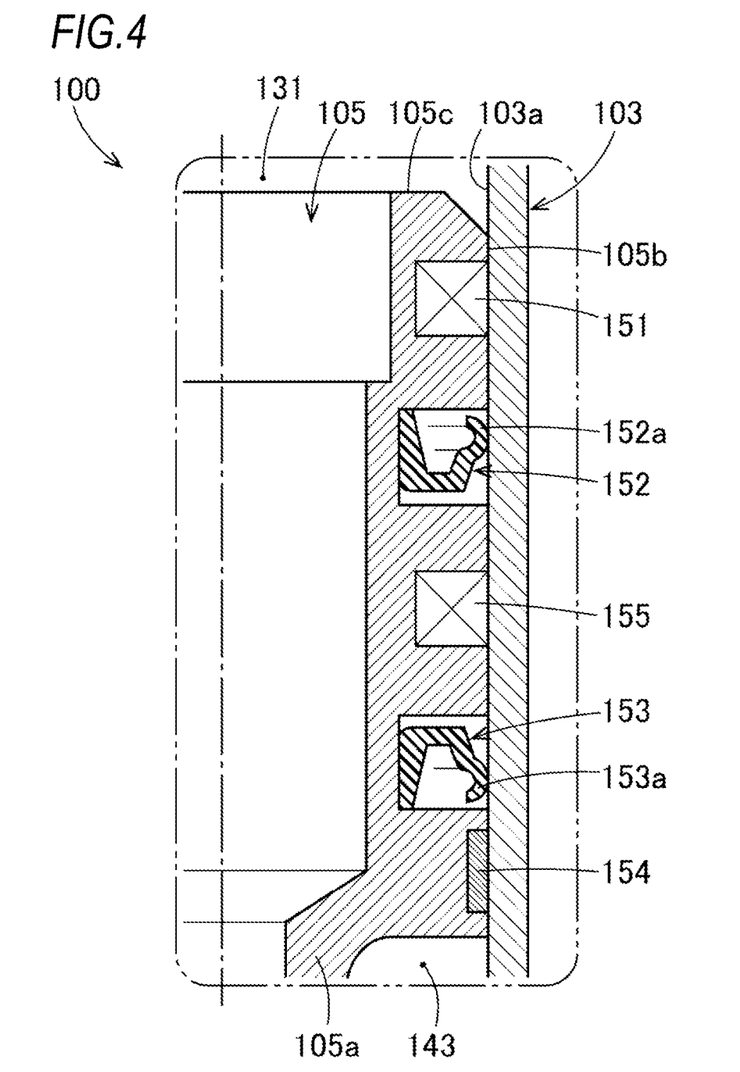
FIG. 4 is a view illustrating a modification example of a seal structure between an inner peripheral surface of a cylinder and an outer peripheral surface of a piston illustrated in FIG. 3.

Furthermore, it is possible to provide a second lubricating member (corresponding to the second lubricating member 155 illustrated in FIG. 4) between the first seal member 252 and the second seal member 253 on the outer peripheral surface 205b of the piston 205.

On an inner peripheral surface 201c of the outer tube 201, a first outer seal member 261, an outer lubricating member 262, a second outer seal member 263, and a bush 264 are provided in this order from an open end 201b of the outer tube 201 toward the closed end 201a. The respective members 261, 262, 263, and 264 can be in sliding contact with an outer peripheral surface 202b of the inner tube 202.

The first outer seal member 261 is provided at the open end 201b in the inner peripheral surface 201c of the outer tube 201. A sealing lip 261a of the first outer seal member 261 faces the outer side in the longitudinal direction of the outer tube 201. The outer lubricating member 262 is provided closer to the closed end 201a than the first outer seal member 261 in the inner peripheral surface 201c of the outer tube 201. The second outer seal member 263 is provided closer to the closed end 201a side than the outer lubricating member 262 in the inner peripheral surface 201c of the outer tube 201. A sealing lip 263a of the second outer seal member 263 faces both sides in the longitudinal direction of the inner tube 202. The bush 264 slidably supports the outer peripheral surface 202b of the inner tube 202.

The operation and effect of the air spring type shock absorber 200 of the second example are basically the same as those of the air spring type shock absorber 100 of the first example except for the operation by the first spring 141 (see FIG. 1), and thus description thereof will be omitted.

The front fork 10 (including the shock absorbers 20, 100, and 200) according to the invention is not limited to the examples as long as the effects and advantages of the invention are exhibited. For example, in the invention, the front fork 10 may be adopted in a vehicle. Further, the front fork 10 can also be used in a motor tricycle of a saddle-ride type vehicle.

INDUSTRIAL APPLICABILITY

The shock absorber 20, 100, and 200 of the invention are suitable for use as the front fork 10 of a saddle-ride type vehicle.

REFERENCE SIGNS LIST

10: front fork
20: shock absorber with damping force generating unit
34: first damping force generating unit
35: second damping force generating unit
100, 200: air spring type shock absorber
101, 201: outer tube
101a, 201a: closed end
101b, 201b: open end
101c, 201c: inner peripheral surface
102, 202: inner tube
102b, 202b: outer peripheral surface
103, 203: cylinder
103a, 203a: inner peripheral surface
104, 204: rod
105, 205: piston
105b, 205b: outer peripheral surface
131, 231: gas chamber (first gas chamber)
132, 232: gas chamber (second gas chamber)
151, 251: first lubricating member
152, 252: first seal member
152a, 252a: sealing lip
153, 253: second seal member
153a, 253a: sealing lip
155, 255: second lubricating member
161, 261: first outer seal member
161a, 261a: sealing lip
162, 262: outer lubricating member
163, 263: second outer seal member
163a, 263a: sealing lip

What is claimed is:
1. A shock absorber, comprising:
a cylindrical outer tube with one end as a closed end and the other end as an open end;
an inner tube partially fitted to the outer tube so as to be able to move forward and backward;
a cylinder provided inside the outer tube and extending inside the inner tube;
a rod extending from an end portion of the inner tube exposed from the outer tube to an inside of the cylinder;
a piston which is provided on the rod and divides the inside of the cylinder to form a gas chamber;
a first lubricating member, which is provided on a side closest to the gas chamber in an outer peripheral surface of the piston so as to be capable of sliding contact with an inner peripheral surface of the cylinder, and which contains a lubricant;

a first seal member, which is provided at a position farther from the gas chamber than the first lubricating member in an outer peripheral surface of the piston, and in which a sealing lip slidably in contact with the inner peripheral surface of the cylinder faces the gas chamber; and a second seal member, which is provided at a position farther from the gas chamber than the first seal member in the outer peripheral surface of the piston, and in which a sealing lip slidably in contact with the inner peripheral surface of the cylinder is directed opposite to the gas chamber.

2. The shock absorber according to claim 1, further comprising:

a second lubricating member, which is provided between the first seal member and the second seal member in the outer peripheral surface of the piston so as to be capable of sliding contact with the inner peripheral surface of the cylinder and, which contains a lubricant.

3. The shock absorber according to claim 2, further comprising:

a first outer seal member which is provided on the open end in an inner peripheral surface of the outer tube so as to be capable of sliding contact with the outer peripheral surface of the inner tube and in which a sealing lip slidably in contact with an outer peripheral surface of the inner tube faces an outer side in a longitudinal direction of the outer tube;

an outer lubricating member, which is provided further on the closed end side than the first outer seal member in the inner peripheral surface of the outer tube so as to be capable of sliding contact with the outer peripheral surface of the inner tube and, which contains a lubricant; and a second outer seal member which is provided further on the closed end side than the outer lubricating member in the inner peripheral surface of the outer tube so as to be capable of sliding contact with the outer peripheral surface of the inner tube.

4. The shock absorber according to claim 2, further comprising:

a first air spring by compressed air in the gas chamber;

a second air spring by compressed air in a gas chamber outside the cylinder in a space surrounded by the outer tube and the inner tube; and a spring for urging the outer tube and the inner tube in a mutually extending direction.

5. A shock absorber, wherein the shock absorber according to claim 2 has a configuration which can be incorporated as one of two shock absorbers which form a front fork of a saddle-ride type vehicle.

6. The shock absorber according to claim 1, further comprising:

a first outer seal member which is provided on the open end in an inner peripheral surface of the outer tube so as to be capable of sliding contact with the outer peripheral surface of the inner tube and in which a sealing lip slidably in contact with an outer peripheral surface of the inner tube faces an outer side in a longitudinal direction of the outer tube;

an outer lubricating member, which is provided further on the closed end side than the first outer seal member in the inner peripheral surface of the outer tube so as to be capable of sliding contact with the outer peripheral surface of the inner tube and, which contains a lubricant; and a second outer seal member which is provided further on the closed end side than the outer lubricating member in the inner peripheral surface of the outer tube so as to be capable of sliding contact with the outer peripheral surface of the inner tube.

7. The shock absorber according to claim 6, further comprising:

a first air spring by compressed air in the gas chamber;

a second air spring by compressed air in a gas chamber outside the cylinder in a space surrounded by the outer tube and the inner tube; and a spring for urging the outer tube and the inner tube in a mutually extending direction.

8. A shock absorber, wherein the shock absorber according to claim 6 has a configuration which can be incorporated as one of two shock absorbers which form a front fork of a saddle-ride type vehicle.

9. The shock absorber according to claim 1, further comprising:

a first air spring by compressed air in the gas chamber;

a second air spring by compressed air in a gas chamber outside the cylinder in a space surrounded by the outer tube and the inner tube; and a spring for urging the outer tube and the inner tube in a mutually extending direction.

10. A shock absorber, wherein the shock absorber according to claim 9 has a configuration which can be incorporated as one of two shock absorbers which form a front fork of a saddle-ride type vehicle.

11. A shock absorber, comprising:

a cylindrical outer tube with one end as a closed end and the other end as an open end;

an inner tube partially fitted to the outer tube so as to be able to move forward and backward;

a cylinder provided inside the outer tube and extending inside the inner tube;

a rod extending from an end portion of the inner tube exposed from the outer tube to an inside of the cylinder;

a piston which is provided on the rod and divides the inside of the cylinder to form a gas chamber;

a first lubricating member, which is provided on a side closest to the gas chamber in an outer peripheral surface of the piston so as to be capable of sliding contact with an inner peripheral surface of the cylinder, and which contains a lubricant;

a first seal member, which is provided at a position farther from the gas chamber than the first lubricating member in an outer peripheral surface of the piston, and in which a sealing lip slidably in contact with the inner peripheral surface of the cylinder faces the gas chamber;

a second lubricating member, which is provided at a position farther from the gas chamber than the first seal member in the outer peripheral surface of the piston so as to be capable of sliding contact with the inner peripheral surface of the cylinder and, which contains a lubricant;

a second seal member, which is provided at a position farther from the gas chamber than the second lubricating member in the outer peripheral surface of the piston, and in which a sealing lip slidably in contact with the inner peripheral surface of the cylinder is directed opposite to the gas chamber;

a first outer seal member, which is provided on the open end in an inner peripheral surface of the outer tube so as to be capable of sliding contact with the outer peripheral surface of the inner tube and, in which a sealing lip slidably in contact with an outer peripheral surface of the inner tube faces an outer side in a longitudinal direction of the outer tube;

an outer lubricating member, which is provided further on the closed end side than the first outer seal member in the inner peripheral surface of the outer tube so as to be capable of sliding contact with the outer peripheral surface of the inner tube and, which contains a lubricant; and a second outer seal member which is provided further on the closed end side than the outer lubricating member in the inner peripheral surface of the outer tube so as to be capable of sliding contact with the outer peripheral surface of the inner tube.

12. A shock absorber, wherein the shock absorber according to claim 1 has a configuration which can be incorporated as one of two shock absorbers which form a front fork of a saddle-ride type vehicle.

13. A shock absorber, wherein the shock absorber according to claim 11 has a configuration which can be incorporated as one of two shock absorbers which form a front fork of a saddle-ride type vehicle.

\* \* \* \* \*